June 17, 1958    H. D. EDWARDS ET AL    2,839,402
SENSITIZED SILVER HALIDE EMULSIONS
Filed Feb. 4, 1952

ETHYL 2-CYANO-3-STYRYL-6-(3-ETHYL-2:3-
DIHYDROBENZTHIAZOLYLIDENE-2)-2:4-HEXADIENOATE

1:1-DICYANO-2-STYRYL-5-(3-ETHYL-2:3-
DIHYDROBENZTHIAZOLYLIDENE-2)-1:3-PENTADIENE

HARRY D. EDWARDS
FRANK P. DOYLE
STANLEY J. PALLING
INVENTORS

BY
ATTORNEYS

United States Patent Office 2,839,402
Patented June 17, 1958

2,839,402

SENSITIZED SILVER HALIDE EMULSIONS

Harry Derek Edwards, Frank Peter Doyle, and Stanley John Palling, Barnet, England, assignors, by mesne assignments, to Eastman Kodak Company, Rochester, N. Y., a corporation of New Jersey Application February 4, 1952, Serial No. 269,894

Claims priority, application Great Britain February 12, 1951

8 Claims. (Cl. 96—102)

This invention relates to new dyestuffs of the polymethine type and intermediates therefor, and to processes for preparing them. Some of the new dyestuffs are capable of sensitising light-sensitive gelatino silver halide emulsions, and the invention therefore comprehends not only the new dyestuffs themselves, intermediates therefor, and processes for preparing them, but also light-sensitive gelatino silver halide emulsions sensitised by such dyestuffs.

Figure 1:
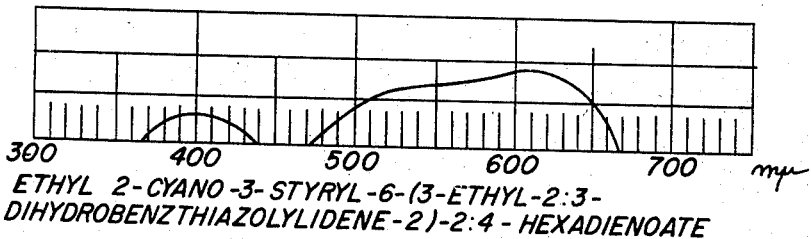
Figure 2:
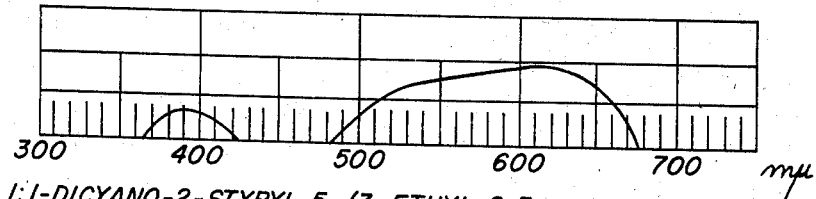

Our invention is briefly illustrated, in part, by the accompanying drawing where:

Figure 1 is a diagrammatic representation of a wedge spectrogram of a photographic silver halide emulsion sensitized with one of our new dyes, and Figure 2 is similarly a diagrammatic representation of a wedge spectrogram of the same photographic silver halide emulsion sensitized with another of our new dyes.

According to one aspect of the invention in a dyestuff of the polymethine type there is on the methine chain a substituent of the formula $(-CH=CH)_n-R$, where $n$ is either zero or 1, and R is either alkyl, aryl or aralkyl. The terms "aryl" and "aralkyl" are intended to include nuclear substituted derivatives of the ring or rings.

According to another aspect of the invention a process for preparing a dyestuff of the polymethine type consists in reacting an intermediate of the formula

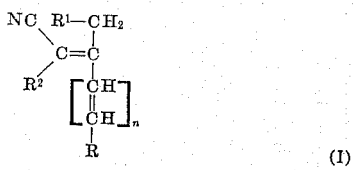

(wherein $R^1$ is either hydrogen, alkyl, aryl, or aralkyl; $R^2$ is an organic grouping such as cyano or carbalkoxy; and R and $n$ are as hereinbefore specified) with a polymethine dyestuff intermediate capable of reacting with the grouping $R^1-CH_2$ of the first mentioned intermediate but not with the grouping $(-CH=CH)_n-R$.

Conveniently the polymethine dyestuff intermediate has one or other of the following formulae:

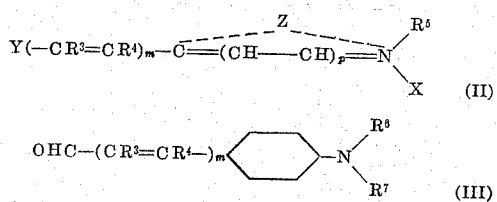

where Z is the residue of a heterocyclic nucleus; $R^3$ and $R^4$ are either the same or different and are either hydrogen, alkyl or aralkyl; $R^5$ is alkyl or aralkyl; $R^6$ and $R^7$ are either the same or different alkyl groups and are usually the same and preferably methyl; X is an anion; Y is a reactive grouping such as alkylmercapto, acetanilido or halogen, and $m$ and $p$ are the same or different and are either zero or a small positive integer.

The nature of the reactions is exemplified by the following illustrations—

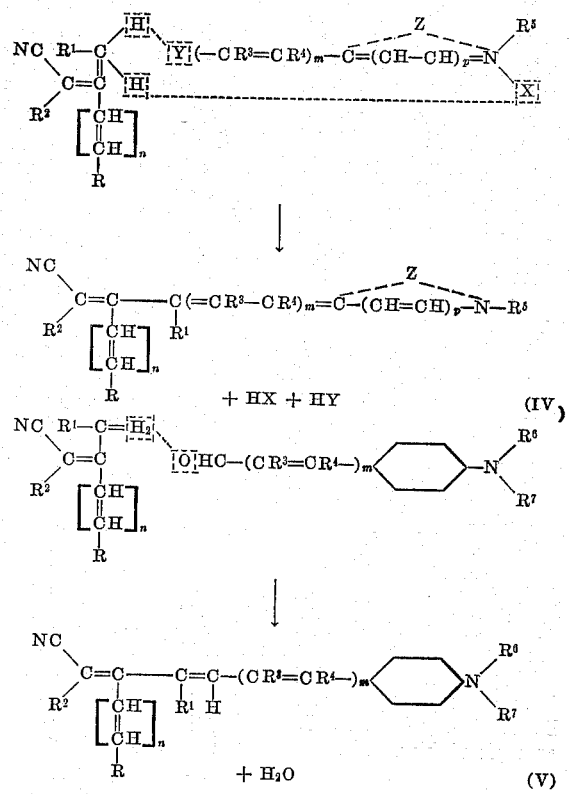

The reactions illustrated above are preferably carried out in the presence of a condensing agent which may be capable of reacting with the product or products split off during the reaction. Suitable condensing agents are pyridine or alcohol and a strong base, e. g. triethylamine or piperidine.

The products represented by the Formulae IV and V comprise new classes of dyestuffs of the polymethine type, and several of the individual dyestuffs in these classes have been found to possess the property of sensitising gelatino silver halide light-sensitive photographic emulsions.

According to another aspect of the invention, therefore, a photographic light-sensitive gelatino silver halide emulsion includes as a sensitiser a dyestuff of the general Formula IV or V.

Intermediates of the Formula I where $n=0$ can be prepared by the following reaction:

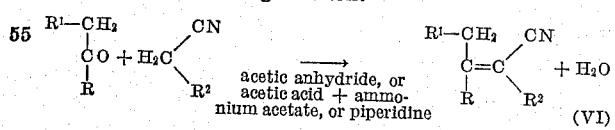

Where $R^2$ is carbethoxy, the intermediates can be prepared from ethyl cyanacetate by the general method described by A. C. Cope, C. M. Hofman, C. Wychoff and E. Hardenbergh in J. A. C. S. 63, page 3452 (1941). An example of this method is as follows:

*Ethyl-2-cyano-3-phenyl-2-butenoate*

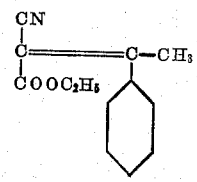

(VII)

Ethyl cyanacetate (14.15 gms.), acetophenone (15 gms.), ammonium acetate (2.0 gms.), and acetic acid (6 gms.) were refluxed together with benzene (100 ccs.) in a round bottomed flask connected to an apparatus for the constant removal of water from the reaction vessel. Heating was continued for 1 hour after water ceased to be formed. The clear yellow solution then obtained was washed well with water, dried with sodium sulphate, and the product was then distilled under reduced pressure, after removal of the benzene on a water bath. The pale yellow oil obtained boiled at 180–183° at 15 mm. pressure.

Other intermediates which may be prepared by this general method are:

(a) Ethyl-2-cyano-3-p-methoxy phenyl - 2 - butenoate, colourless oil B. Pt. 216–218°/14 mm. darkening on keeping.

(b) Ethyl-2-cyano-3-p-tolyl-2-butenoate, colourless oil, B. Pt. 193–196°/15 mm. becoming yellow on keeping.

(c) Ethyl-2-cyano-3-methyl-5-phenyl-2;4 pentadienoate, obtained as a very pale yellow solid melting at 86° C. on recrystallizing from alcohol.

(d) Ethyl-2-cyano-3-methyl-5-p-methoxy phenyl-2;4 pentadienoate, obtained as a light yellow solid melting at 94–5° on recrystallizing from alcohol.

(e) Ethyl-2-cyano-3-phenyl-2-pentenoate, colourless oil B. Pt. 183–186°/14 mm. becoming yellow on keeping.

(f) Ethyl-2-cyano-3-(β naphthyl) - 2 - butenoate, obtained as a pale yellow solid, melting at 74° C. on recrystallising from alcohol.

(g) Ethyl - 2 - cyano-3-isopropyl-2-butenoate, colourless oil of B. Pt. 127–128°/15 mm. becoming yellow on keeping.

Where $R^2$ is cyano, the intermediates can be prepared from malononitrile by the general method described by D. T. Mowry in J. A. C. S. 65, page 991 (1943). An example of this method is as follows:

*1;1 dicyano-2-phenyl-1-propene*

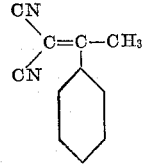

(VIII)

16.5 gms. malononitrile (0.25 mole) 30 gms. acetophenone (0.25 mole) 2 gms. ammonium acetate and 6 gms. of acetic acid were refluxed with 100 ccs. of benzene under a condenser fitted to an apparatus for the constant removal of water. Refluxing was continued for 1 hour after water ceased to be formed. The solution was then cooled, washed with water and dried with anhydrous sodium sulphate. The benzene was removed and the residue, on cooling, solidified. The product was recrystallised from alcohol and was obtained as colourless crystals melting at 91° C.

Other intermediates which may be prepared by this general method are:

(a) 1;1 dicyano-2-methyl-4-phenyl-1;3 butadiene, obtained as light cream needles of melting point 130° on recrystallising from benzene.

(b) 1;1 dicyano-2;3 dimethyl-1-butene, colourless oil B. Pt. 110°/15 mm. becoming yellow on keeping.

(c) 1;1 dicyano-2-β-naphthyl-1-propene, white crystals of melting point 105° on recrystallising from dilute alcohol.

(d) 1;1 dicyano-2-tert butyl-1-propene, colourless oil of B. Pt. 120–123°/14 mms. becoming yellow on keeping.

(e) 1;1 dicyano-2-p-methoxy phenyl-1-propene, obtained as light yellow crystals melting at 73–4° C.

Intermediates of the Formula I where $n=1$, which represent a new class of intermediates constituting one aspect of the present invention, can be prepared by the following reaction which is similar to those described above, R being phenyl in this case:

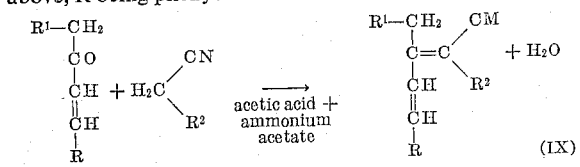

(IX)

According to a further aspect of the invention, therefore, a method of preparing a dyestuff intermediate comprises reacting a compound of the formula:

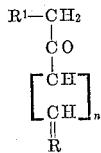

with a compound of the formula:

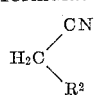

in the presence of a condensing agent.

The following examples further illustrate the invention. All parts given in the examples are by weight.

EXAMPLE 1

*Ethyl-2-cyano-3-phenyl-4-(3-ethyl-2;3 dihydrobenzthiazolylidene-2)-2-butenoate*

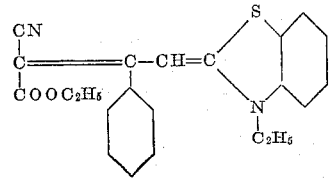

2.15 parts of ethyl-2-cyano-3-phenyl-2-butenoate prepared as described above and 3.9 parts of 2 ethyl mercapto benzthiazole etho toluene p-sulphonate were dissolved in 25 parts of hot alcohol.

3.0 parts of triethylamine were then added and the solution refluxed for 5 mins. After this time the dye had separated out of solution and, on cooling, it was filtered off and recrystallised from dry benzene in the form of bright yellow crystals melting at 194°.

When the dye was incorporated in a gelatino silver halide photographic emulsion, the sensitivity was extended to 5400 A.

EXAMPLE 2

*Ethyl-2-cyano - 3 - phenyl-6-(3-ethyl-2;3 dihydrobenzthiazolylidene-2)-2;4 hexadienoate*

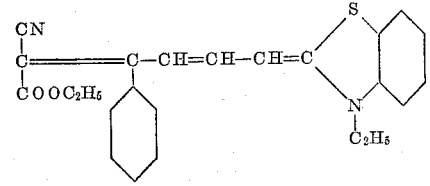

2.15 parts of ethyl-2-cyano-3-phenyl-2-butenoate prepared as described above and 4.5 parts of 2-ω-acetanilidovinyl benzthiazole ethiodide were dissolved in 100 parts of hot alcohol. 3.0 parts of triethylamine were added and the solution refluxed for 20 mins.

The dye crystallised on cooling, and after filtering was recrystallised from dry benzene in the form of dark green crystals melting at 172°.

When incorporated in a gelatino silver halide photographic emulsion, the dyestuff extended the sensitivity to 6400 A., with a maximum at 6000 A.

EXAMPLE 3

*Etheyl-2-cyano-3-p-methoxy phenyl 5-p-dimethyl amino phenyl-2;4 pentadienoate*

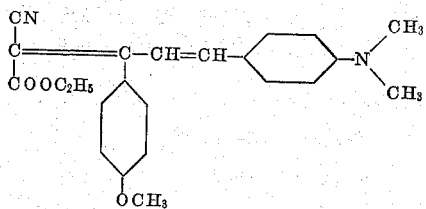

1.5 parts of p-dimethylamino benzaldehyde and 2.4 parts of ethyl-2-cyano-3-p-methoxy phenyl-2-butenoate were dissolved in 15 parts of hot alcohol. 1.0 part of piperidine was then added and the solution refluxed for 10 minutes.

On cooling, the dye was deposited and after filtering, it was recrystallised from dry benzene in the form of orange crystals melting at 106°.

EXAMPLE 4

*Ethyl-2-cyano-3-p-methoxy phenyl-6-(3-ethyl-2;3 dihydro-thiazolinylidene-2)-2;4 hexadienoate*

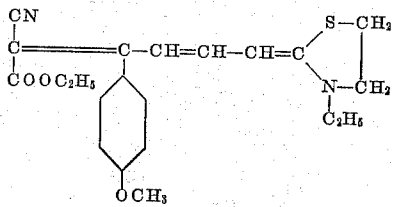

4.03 parts of 2-ω-acetanilidovinyl thiazoline ethiodide and 2.40 parts of ethyl-2-cyano-3-p-methoxy phenyl-2-butenoate were dissolved in 30 parts of hot alcohol. 3.0 parts of triethylamine were then added and the solution refluxed for 12 minutes.

On cooling, the dye crystallised and after filtering was recrystallised from dry benzene in the form of bright red crystals melting at 197°.

When the dye was incorporated in a gelatino silver halide photographic emulsion the sensitivity was extended to 6100 A. with a maximum at 5500 A.

EXAMPLE 5

*Ethyl-2-cyano-3-p-methoxy phenyl-6-(3-ethyl-2;3 dihydro-benzoxazolylidene-2)-2;4 hexadienoate*

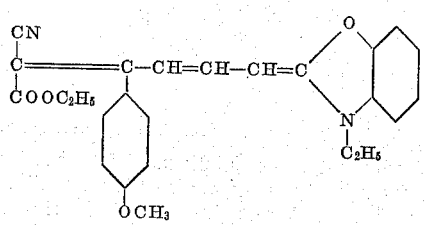

2.4 parts of ethyl-2-cyano-3-p-methoxy phenyl-2-butenoate and 4.3 parts of 2-ω-acetanilidovinyl benzoxazole ethiodide were dissolved in 20 parts of hot alcohol. 3.0 parts of triethylamine were then added and the mixture refluxed for 10 mins.

On cooling the dye was deposited and after filtering was recrystallised from dry benzene in the form of purple-red crystals melting at 236°.

When the dye was incorporated in a gelatino silver halide photographic emulsion the sensitivity was extended to 5900 A. with a maximum at 5600 A.

EXAMPLE 6

*Ethyl-2-cyano-3-p-methoxy phenyl-8-(3-ethyl-2;3 dihydro-benzthiazolylidene-2)-2;4;6 octatrienoate*

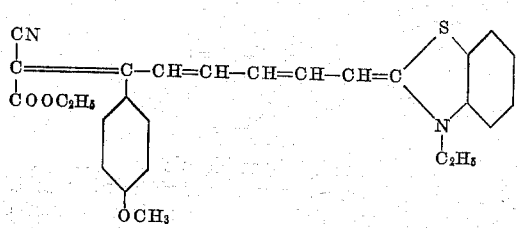

2.5 parts of 2-ω-acetanilido butadienyl benzthiazole ethiodide and 1.2 parts of ethyl-2-cyano-3-p-methoxy phenyl-2-butenoate were dissolved in 50 parts of hot alcohol. 1.5 parts of triethylamine were then added and the solution refluxed for 10 minutes.

On cooling the dark blue solution, the dyestuff was deposited, and after filtering was recrystallised from dry benzene as dark crystals melting at 216°.

When the dye was incorporated in a gelatino silver halide photographic emulsion the sensitivity was extended from 5800 A. to beyond 7000 A.

EXAMPLE 7

*Ethyl-2-cyano-3-p-tolyl-4-(3-ethyl-2;3 dihydro benzthiazolylidene-2)-2-butenoate*

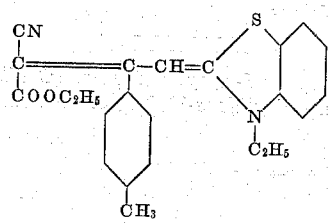

3.9 parts of 2 ethylmercapto benzthiazole ethyl-p-toluene sulphonate and 2.3 parts of ethyl-2-cyano-3-p-tolyl-2-butenoate were dissolved in 20 parts of hot alcohol. 3.0 parts of triethylamine were then added, and the mixture refluxed for 5 minutes.

On cooling, the dye was deposited, and after filtering, it was recrystallised from dry benzene in the form of light orange crystals melting at 226°.

EXAMPLE 8

*Ethyl-2-cyano-3-styryl-4-(3-ethyl-2;3 dihydro-benzthiazolylidene-2)-2-butenoate*

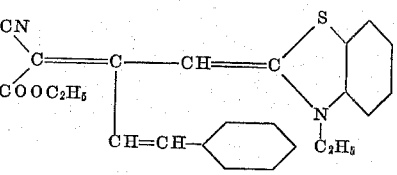

3.9 parts of 2 ethyl mercapto benzthiazole etho p-toluene sulphonate and 2.41 parts of ethyl-2-cyano-3-methyl-5-phenyl-2;4 pentadienoate were dissolved in 25 parts of hot alcohol. 3.0 parts of triethylamine were then added, and the solution was refluxed for 5 mins. On cooling, the dye was deposited and after filtering was recrystallised from dry benzene in the form of bright red crystals melting at 207°.

When the dye was incorporated in a gelatino silver halide photographic emulsion, it extended the sensitivity to 5000 A.

EXAMPLE 9

*Ethyl-2-cyano-3-styryl-6-(3-ethyl-2;3-dihydro-benzthiazolylidene-2)-2;4 hexadienoate*

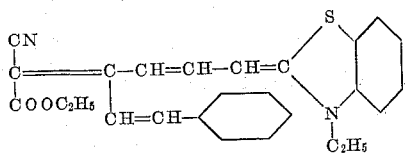

1.5 parts of 2 methyl benzthiazole and 2.0 parts of ethyl toluene p-sulphonate were fused together at 150° for 3 hours in an oil bath. The melt was then dissolved in 25 parts of acetic anhydride, 2.1 parts of triethyl trithio ortho formate added, and the solution refluxed for ½ hour, when the colour of the solution had faded to a dull yellow.

The acetic anhydride was removed by distillation under reduced pressure, leaving an oily residue which was washed several times with ether.

This oil was dissolved in 30 parts of hot alcohol together with 2.41 parts of ethyl-2-cyano-3-methyl-5-phenyl-2;4 pentadienoate. 3.0 ccs. of triethylamine were then added and the solution refluxed for 15 mins. On cooling the dye deposited, and after filtering was recrystallised from dry benzene in the form of small blue crystals melting at 211–2°.

When the dye was incorporated in a gelatino silver halide photographic emulsion, it extended the sensitivity to 6900 A., with a maximum at 6400 A.

This dye is a particularly good sensitizer for chlorobromide emulsions.

EXAMPLE 10

*Ethyl-2-cyano-3-styryl-6-(3-ethyl-2;3 dihydro-thiazolinylidene-2)-2;4 hexadienoate*

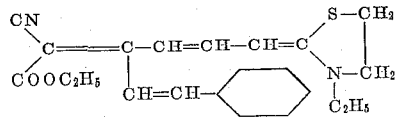

4.2 parts of 2-ω-acetanilidovinyl thiazoline ethiodide and 2.41 parts of ethyl-2-cyano-3-methyl-5-phenyl-2;4 pentadienoate were dissolved in 25 parts of hot alcohol. 3.0 parts of triethylamine were then added and the solution refluxed for 10 mins. On cooling, the dye separated and after filtering was recrystallised from dry benzene in the form of dark blue crystals melting at 143°.

When the dye was incorporated in a gelatino silver halide photographic emulsion the sensitivity was extended 6100 A. with a maximum at 5800 A.

EXAMPLE 11

*Ethyl-2-cyano-3-p-methoxy styryl-4-(3-ethyl-2;3 dihydrobenzthiazolylidene-2)-2-butenoate*

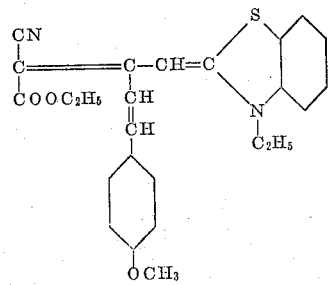

2.0 parts of 2-ethyl mercapto benzthiazole ethyl toluene-p-sulphonate and 1.4 parts of ethyl-2-cyano-3-methyl-5-p-methoxy phenyl-2;4 pentadienoate were dissolved in 15 parts of hot alcohol. 1.5 parts of triethylamine were then added and the mixture refluxed for 10 mins.

On cooling the dye was deposited and after filtering was recrystallised from dry benzene in the form of orange crystals melting at 228°.

EXAMPLE 12

*Ethyl-2-cyano-3-β-naphthyl-3-(3-ethyl-2;3 dihydro-benzthiazolylidene-2)-1-propene*

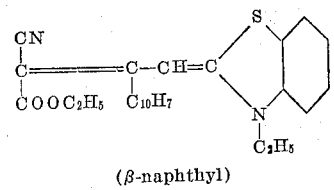

(β-naphthyl)

1.3 parts of ethyl-2-cyano-3-β-naphthyl-2-butenoate and 2.0 parts of 2 ethyl mercapto benzthiazole ethyl toluene-p-sulphonate were dissolved in 15 parts of hot alcohol. 1.0 part of triethylamine were then added and the mixture warmed for 30 seconds, whereupon the dye separated as orange crystals.

It was filtered off, dried and recrystallised from benzene in the form of dark yellow crystals melting at 260°.

EXAMPLE 13

*1;1 dicyano-2-phenyl-3-(methyl-2;3 dihydrobenzthiazolylidene-2)-1-propene*

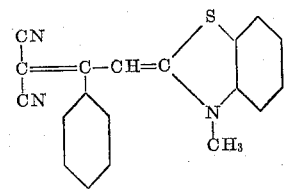

3.6 parts of 2 methylmercapto benzthiazole metho-p-toluene sulphonate and 1.68 parts of 1;1 dicyano-2-phenyl-1-propene prepared as described above were dissolved in 50 parts of hot alcohol. On the addition of 3.0 parts of triethylamine, the dye was precipitated, and after filtering was recrystallised from dry benzene in the form of yellow crystals melting at 272°.

EXAMPLE 14

*1;1 dicyano-2-phenyl-3-(3-ethyl-2;3 dihydrobenzthiazolylidene-2)-1-propene*

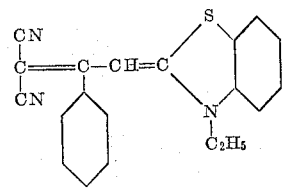

1.9 parts of 2 ethyl mercapto benzthiazole and 2.0 parts of ethyl p-toluene sulphonate were fused together at 140° for 3 hours. The cooled melt was dissolved in 30 parts of alcohol, and 1.68 parts of 1;1 dicyano-2-phenyl-1-propene prepared as described above were added.

3.0 parts of triethylamine were then added, and the solution refluxed for 15 mins. Yellow crystals of the dye were deposited on cooling, which were separated by filtration and recrystallised from dry benzene in the form of yellow needles melting at 230°.

When incorporated in a gelatino silver halide photographic emulsion the dyestuff extended the sensitivity to 5300 A., with a maximum at 5000 A.

This dye is a particularly good sensitizer for chlorobromide emulsions.

EXAMPLE 15

1;1 dicyano-2-phenyl-5-(3-ethyl-2;3 dihydrobenzthiazolylidene-2)-1;3 pentadiene

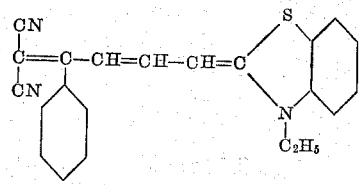

4.5 parts of 2-beta-acetanilidovinyl benzthiazole ethiodide and 1.68 parts of 1;1 dicyano-2-phenyl-1-propene prepared as described above were dissolved in 75 parts of hot alcohol. 3.0 parts of triethylamine were then added, and the solution refluxed for 4 mins.

The dye was deposited on cooling, and after filtering, was recrystallised from dry benzene in the form of steel blue crystals melting at 222°.

When incorporated in a gelatino-silver halide photographic emulsion, the dyestuff extended the sensitivity to 6800 A., with a maximum at 6400 A.

This dye is a particularly good sensitizer for chlorobromide emulsions.

EXAMPLE 16

1;1 dicyano-2-styryl-3-(3-methyl-2;3 dihydrobenzthiazolylidene-2)-1-propene

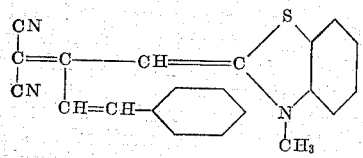

3.66 parts of 2 methyl mercapto benzthiazole metho-p-toluene sulphonate and 1.94 parts of 1;1 dicyano-2-methyl-4-phenyl butadiene were dissolved in 50 parts of hot alcohol. 3.0 parts of triethylamine were then added to the solution, and on cooling, the dye was deposited.

After recrystallising from dry benzene it was obtained in the form of orange crystals melting at 256° with previous softening.

When the dye was incorporated in a gelatino silver halide photographic emulsion, it extended the sensitivity to 5300 A.

EXAMPLE 17

1;1 dicyano-2-styryl-3-(3-ethyl-2;3 dihydrobenzthiazolylidene-2)-1-propene

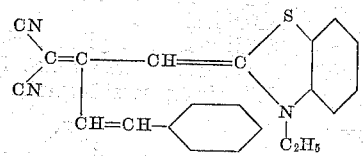

3.9 parts of 2 ethyl mercapto benzthiazole etho-p-toluene sulphonate and 1.94 parts of 1;1 dicyano-2-methyl-4-phenyl butadiene were dissolved in 20 parts of hot alcohol. 3.0 parts of triethylamine were then added, and the solution cooled. The dye was deposited, and after filtering was recrystallised from dry benzene in the form of orange crystals melting at 228°.

When incorporated in a gelatino silver halide photographic emulsion, the sensitivity was extended to 5700 A.

EXAMPLE 18

1;1 dicyano-2-styryl-5-(3-ethyl-2;3 dihydrobenzthiazolylidene-2)-1;3 pentadiene

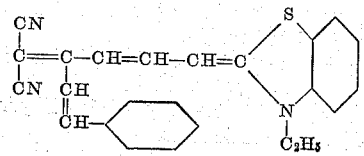

4.5 parts of 2-ω-acetanilidovinyl benzthiazole ethiodide and 1.9 parts of 1;1 dicyano 2 methyl-4-phenyl 1;3 butadiene were dissolved in 75 parts of hot alcohol. 3.0 parts of triethylamine were then added and the solution refluxed for 15 minutes.

On cooling the dye was deposited, and after filtering and drying was recrystallised from dry benzene in the form of dark green crystals melting at 146°.

When the dye was incorporated in a gelatino silver halide photographic emulsion, the sensitivity was extended to 6900 A. with a maximum at 6400 A.

This dye is a particularly good sensitiser for chlorobromide emulsions.

EXAMPLE 19

1;1 dicyano-2-isopropyl-3-(3-ethyl-2;3 dihydrobenzthiazolylidene-2)-1-propene

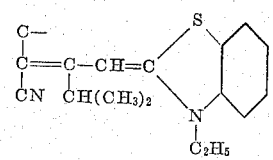

3.9 parts of 2-ethyl mercapto benzthiazole etho toluene p-sulphonate and 1.34 parts of 1;1 dicyano-2-isopropyl-1-propene were dissolved in 20 parts of hot alcohol. 3.0 parts of triethylamine were then added, and on cooling the solution, the dye was deposited.

After filtering, it was recrystallised from dry benzene in the form of bright yellow crystals melting at 169°.

When the dye was incorporated on a gelatino silver halide photographic emulsion the sensitivity was extended to 5350 A. with a maximum at 5100 A.

This dye is a particularly good sensitizer for chlorobromide emulsions.

EXAMPLE 20

1;1 dicyano-2-isopropyl-5-(3-ethyl-2;3 dihydrobenzthiazolylidene-2)-1;3 pentadiene

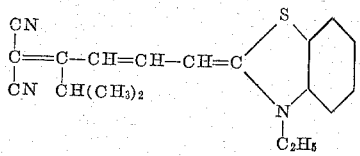

1.6 parts of 1;1 dicyano-2;3 dimethyl-1-butene and 4.5 parts of 2-ω-acetanilidovinyl benzthiazole ethiodide were dissolved in 100 parts of hot alcohol. 3.0 parts of triethylamine were added and the solution refluxed for 15 mins.

The dye deposited on cooling, and after filtering was recrystallised from dry benzene in the form of steel blue needles melting at 188°.

When incorporated in a gelatino silver halide photographic emulsion, the dye extended the sensitivity to 6700 A., with a maximum at 6200 A.

This dye is a particularly good sensitizer for chlorobromide emulsions.

EXAMPLE 21

1;1 dicyano-2-isopropyl-5-(1;3;3 trimethyl-1;2 dihydroindolenylidene-2)-1;3 pentadiene

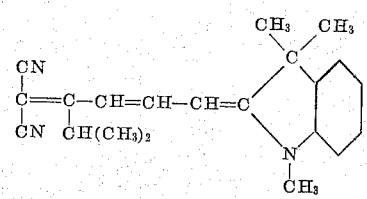

4.5 parts of 2-ω-acetanilidovinyl 3;3 dimethyl indolenine methiodide and 1.36 parts of 1;1 dicyano-2;3 dimethyl-1-butene were dissolved in hot alcohol. 3.0 parts of triethylamine were then added and the mixture refluxed for 30 minutes.

On cooling the dye was deposited and after filtering was recrystallised from dry benzene in the form of shining purple crystals melting at 207°.

EXAMPLE 22

*1;1 dicyano-2-tert butyl-3-(3-ethyl-2;3 dihydrobenzthiazolylidene -2)-1-propene*

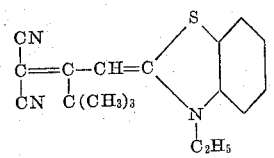

3.9 parts of 2 ethyl mercapto benzthiazole ethyl toluene p-sulphonate and 1.5 parts of 1;1 dicyano-2;3;3 trimethyl-1-butene were dissolved in hot alcohol. 2.5 parts of triethylamine were then added and the mixture refluxed for 10 mins.

On cooling, the dye was deposited and after filtering was recrystallised from dry benzene in the form of yellow crystals melting at 181°.

EXAMPLE 23

*1;1 dicyano-2-p-methoxy phenyl-3-(3-ethyl 2;3 dihydrobenzthiazolylidene-2)-1-propene*

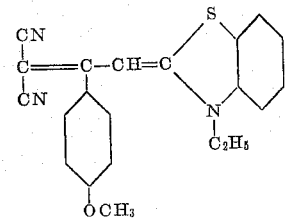

3.9 parts of 2 ethyl mercapto benzthiazole etho-p-toluene sulphonate and 1.98 parts of 1;1 dicyano 2-p-methoxy phenyl-1-propene were dissolved in 20 parts of hot alcohol. 3.0 parts of triethylamine were then added to the solution. After a short while the dyestuff was deposited. It was filtered, dried and recrystallised from dry benzene in the form of yellow crystals melting at 219°.

EXAMPLE 24

*1;1 dicyano-2-p-methoxy phenyl-5-(3-ethyl-2;3-dihydrothiazolinylidene-2)-1;3 pentadiene*

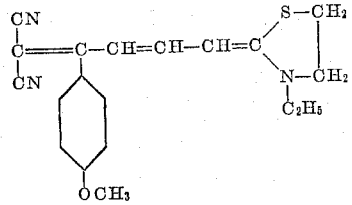

1.98 parts of 1;1 dycyano-2-p-methoxy phenyl-1-propene and 4.03 parts of 2-ω-acetanilidovinyl thiazoline ethiodide were dissolved in 25 parts of hot alcohol. 3.0 parts of triethylamine were then added and after warming the solution for one minute the dye separated out.

It was filtered off, dried and recrystallised from dry benzene in the form of shining purple crystals melting at 263°.

When incorporated in a gelatino silver halide photographic emulsion the sensitivity was extended to 6000 A. with a maximum at 5400 A.

This dye is a particularly good sensitizer for chloro-bromide emulsions.

Further reference is made to the accompanying drawing where Fig. 1 is a diagrammatic representation of a wedge spectrogram of a photographic silver bromiodide emulsion spectrally (optically) sensitized with ethyl 2-cyano - 3 - styryl - 6 - (3 - ethyl - 2;3 - dihydrobenzthiazolylidene-2;4 hexadienoate. The preparation of this dye is described in Example 9 above.

Fig. 2 is a diagrammatic representation of a wedge spectrogram of a photographic silver bromiodide emulsion spectrally sensitized with 1;1 dicyano-2-styryl-5-(3-ethyl-2;3 - dihydrobenzthiazolylidene - 2) - 1;3 - pentadiene. The preparation of this dye is illustrated in Example 18 above.

What we claim as our invention and desire to secure by Letters Patent is:

1. A photographic light-sensitive gelatino silver halide emulsion sensitised with a dyestuff selected from the group consisting of those represented by the following general formula:

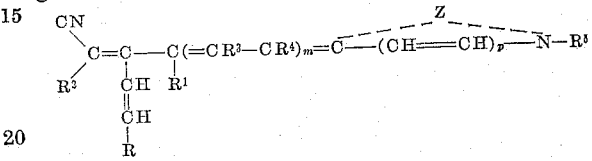

wherein R represents an aryl group; $R^1$ represents a member selected from the group consisting of a hydrogen atom, alkyl, aryl, and aralkyl; $R^2$ represents a member selected from the group consisting of a cyano group and carbalkoxy; $R^3$ and $R^4$ represent a member selected from the group consisting of a hydrogen atom, alkyl, and aralkyl; $R^5$ represents a member selected from the group consisting of alkyl and aralkyl; Z represents the residue of a heterocyclic nucleus; $p$ represents a member selected from the group consisting of zero and 1, and $m$ represents a member selected from the group consisting of zero and the small positive integers.

2. A photographic light-sensitive gelatino silver halide emulsion sensitized with a dyestuff selected from those represented by the following general formula:

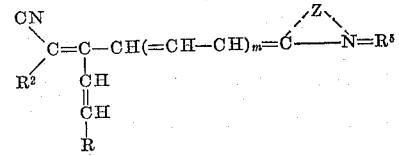

wherein R represents an aryl group, $R^2$ represents a member selected from the group consisting of cyano and carbalkoxy; $R^5$ represents a lower alkyl group; $m$ represents a member selected from the group consisting of zero, one, and two; and Z represents the non-metallic atoms necessary to complete a heterocyclic nucleus selected from the group consisting of benzthiazole, thiazoline, benzoxazole, and indolenine.

3. A photographic light-senstive gelatino silver halide emulsion sensitised with a dyestuff selected from those represented by the following general formula:

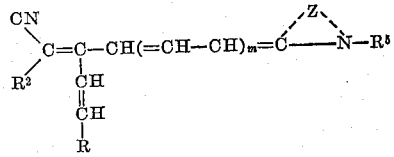

wherein R represents a member selected from the group consisting of phenyl, methoxyphenyl, tolyl, and naphthyl; $R^2$ represents a member selected from the group consisting of cyano and carbethoxy; $R^5$ represents a member selected from the group consisting of methyl and ethyl; $m$ represents a member selected from the group consisting of zero, one and two; and Z represents the non-metallic atoms necessary to complete a heterocyclic nucleus selected from the group consisting of benzthiazole, thiazoline, benzoxazole, and indolenine.

4. A photographic light-sensitive gelatino silver halide emulsion sensitized by the addition thereto of ethyl-2-cyano - 3 - styryl - 6 - (3 - ethyl - 2;3 - dihydrobenzthiazolylidene-2)-2;4 hexadienoate.

5. A photographic light-sensitive gelatino silver halide emulsion sensitized by the addition thereto of 1;1 dicyano - 2 - styryl - 5 - (3 - ethyl - 2;3 dihydrobenzthiazolylidene-2)-1;3 pentadiene.

6. A photographic light-sensitive gelatino silver halide emulsion sensitized by the addition thereto of ethyl-2-cyano - 3 - styryl - 4 - (3 - ethyl - 2;3 dihydrobenzthiazolylidene-2)-2-butenoate.

7. A photographic light-sensitive gelatino silver halide emulsion sensitized by the addition thereto of 1;1 dicyano- 2 - styryl - 3 - (3 - methyl - 2;3 dihydrobenzthiazolylidene-2)-1-propene.

8. A photographic light-sensitive gelatino silver halide emulsion sensitized by the addition thereto of 1;1 dicyano- 2 - styryl - 3 - (3 - ethyl - 2;3 dihydrobenzthiazolylidene - 2)-1, propene.

References Cited in the file of this patent

UNITED STATES PATENTS

| | | |
|---|---|---|
| 2,065,411 | Zeh et al. | Dec. 22, 1936 |
| 2,166,736 | White et al. | July 18, 1939 |
| 2,226,156 | Brooker et al. | Dec. 24, 1940 |
| 2,233,511 | Brooker et al. | Mar. 4, 1941 |
| 2,263,749 | White et al. | Nov. 25, 1941 |
| 2,265,909 | Kendall | Dec. 9, 1941 |
| 2,282,115 | Brooker et al. | May 5, 1942 |
| 2,320,654 | Riester | June 1, 1943 |
| 2,322,015 | Hamer | June 15, 1943 |
| 2,330,203 | Brooker et al. | Sept. 28, 1943 |
| 2,336,463 | Brooker et al. | Dec. 14, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,466,523 | White et al. | Apr. 5, 1949 |
| 2,495,260 | Jennen et al. | Jan. 24, 1950 |
| 2,518,476 | Kendall et al. | Dec. 14, 1950 |
| 2,697,707 | Kendall et al. | Dec. 21, 1954 |

OTHER REFERENCES

Chemical Abstracts 16: 3101 (copy in S. L.) (Abstract of Brit. Med. Journal, 1922, I, 514–515).

Chemical Abstracts 19: 530 (copy in S. L.) (Abstract of Proc. Roy. Soc., London, 96B, 317–333, 1924).